Figure 1:
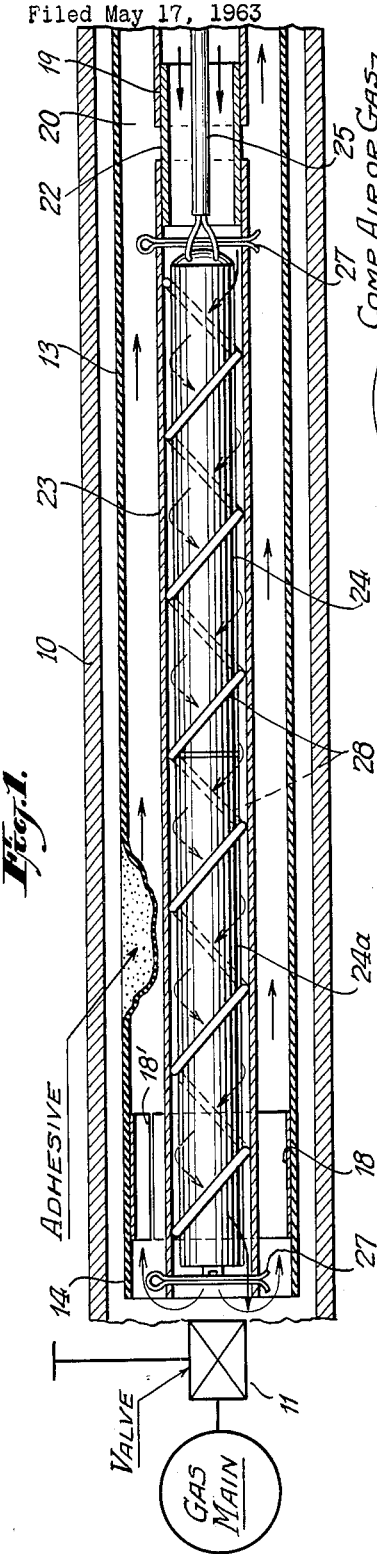

July 19, 1966  A. N. ANDERSON ET AL  3,261,374

METHOD AND MEANS FOR SEALING LEAKING PIPES

Filed May 17, 1963  2 Sheets-Sheet 1

July 19, 1966   A. N. ANDERSON ET AL   3,261,374
METHOD AND MEANS FOR SEALING LEAKING PIPES
Filed May 17, 1963   2 Sheets-Sheet 2
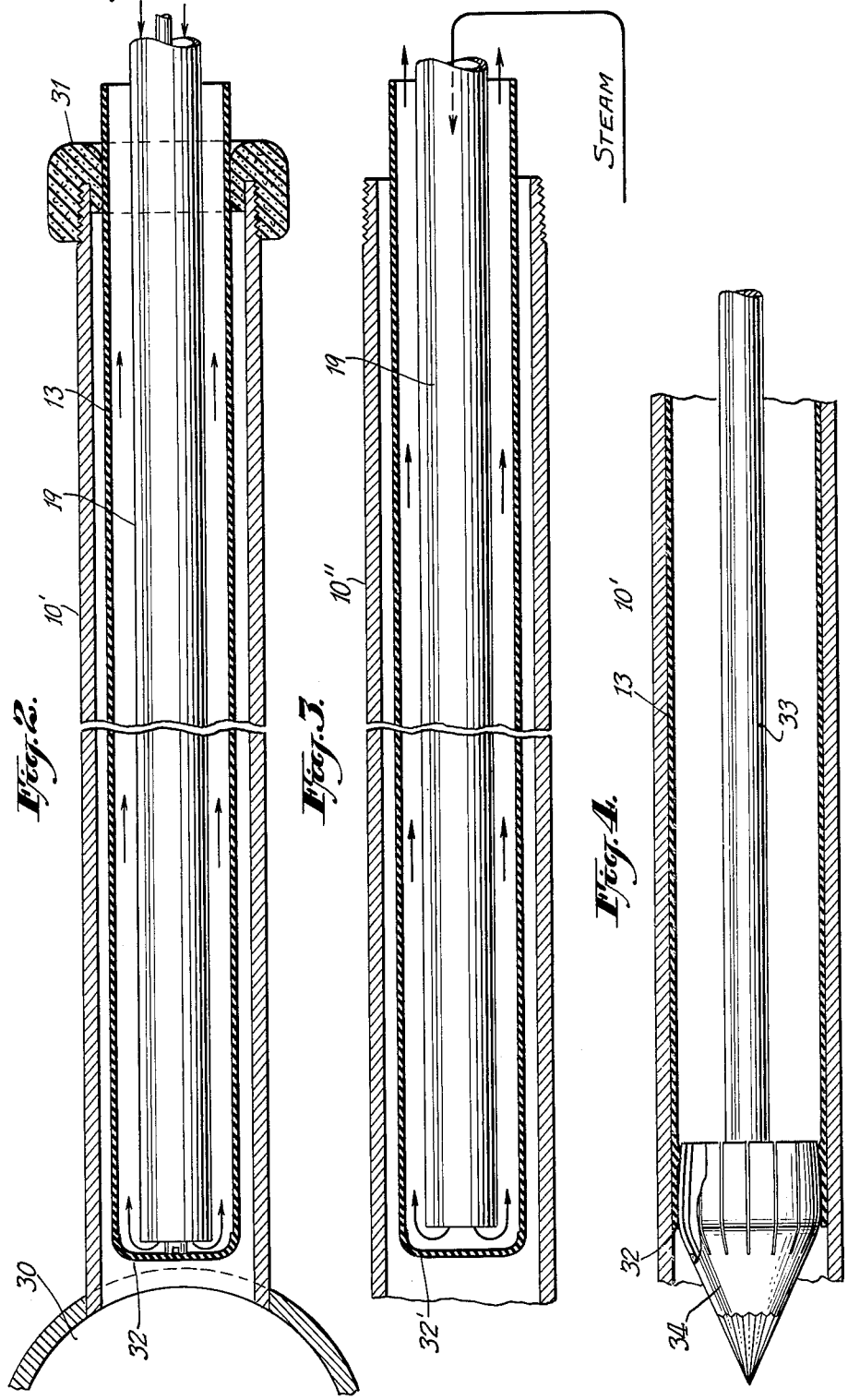

United States Patent Office 3,261,374
Patented July 19, 1966

3,261,374
METHOD AND MEANS FOR SEALING
LEAKING PIPES
Arthur N. Anderson, Plandome Manor, Constantine P. Xenis, Douglaston, and Philip A. Philippidis, Astoria, N.Y., assignors to Consolidated Edison Company of New York, Inc., New York, N.Y., a corporation of New York
Filed May 17, 1963, Ser. No. 281,313
12 Claims. (Cl. 138—97)

This invention relates to methods and means for sealing leaking pipes and is more particularly adapted, among other possible uses, for the sealing of leaks in underground pipes or conduits such as gas pipes, including any leaking joints which may occur in same, for example in cases such as gas mains and service lines.

After underground gas service pipes and the like have long been in use, leaks sometimes occur therein due to corrosion, cracking or deterioration of joints, so that it becomes important to provide a method and means for sealing such leaks, if possible, without going to the expense of unearthing or replacing considerable lengths of the pipe.

In accordance with the present invention, this problem is solved by inserting into the pipe a length or several interconnected lengths of a heat-reactive type of plastic tubing of a diameter such that same may readily be inserted, and the plastic tubing being of a character such that, after being inserted, same may be expanded by the application of heat thereto, so that same will tightly fit within the pipe and remain permanently in such condition for sealing any such leaks which may exist. Preferably such plastic tubing is coated with a suitable adhesive such as a bituminous material, which will cause the plastic tubing throughout its surface areas to become adhered to the interior of the pipe, thereby further insuring that the leaks will be closed and that the tubing will remain adhered in place for covering the interior surfaces of the gas pipe.

It has been known heretofore that certain plastic articles, such for example as extruded polyvinyl chloride, may be so made that upon application of heat for a short period, same will shrink to a considerably smaller diameter and remain permanently in that state. For example, tubing of such material may be originally made with a predetermined normal diameter, then expanded, while heated, to a larger diameter and thereupon cooled. In such condition, the tubing will have a so-called "memory," such that upon reheating, it will tend naturally to shrink to a smaller diameter. For the present invention, plastic tubing may be used which involves such a memory phenomena in the opposite sense. That is, the tubing as initially extruded in heated condition with a predetermined diameter, is then restricted to a smaller diameter and chilled. In that condition it will have a "memory" such that upon reheating it will tend to expand to its original predetermined diameter or nearly so. Thus for the purposes of the present invention, plastic tubing may be prepared in this way with a diameter slightly less than the diameter of a pipe in which leaks are to be sealed, and this tubing may be inserted into the pipe and thereupon heated and thereby permanently expanded tightly to fit within the pipe and seal the leaks, particularly if the tubing is coated with a tacky or adhesive material such as above mentioned.

The use of such plastic heat-expansible tubing for the purposes of the present invention, however, necessarily involves certain special method steps and expedients. For example, when such tubing is caused to expand in diameter, it will normally contract very substantially in the longitudinal direction and preferably it should not be restrained against doing so. Otherwise the problem will arise that the plastic walls thereof will necessarily become thinner and possibly irregularly so, depending upon various possible conditions of tension, and the walls at places might become too thin to resist any pressure within the pipe. Furthermore, the proper heating of such expansible plastic tubing after it has been inserted within an underground pipe for example, presents various problems which in part are due to such longitudinal contraction.

Thus, according to the preferred ways of carrying out the invention, the heat-reactive expansible plastic tubing, after being inserted in the pipe, is subjected to heat progressively along its length. Starting for example at the remote end from the point of insertion of the tubing (herein referred to as the "far end"), heat is applied by suitable means to the interior thereof, the zone of heating being progressively advanced toward the end of the pipe where the tubing was inserted (herein referred to as the "near end"). Thus the far end of the tubing becomes expanded into firm engagement with the interior walls of the far end of the pipe and is there anchored in effect, and as the heating progresses toward the near end, the tubing will contract longitudinally to a considerable degree, and lengths thereof will be drawn into the pipe as the heating and sealing thereof in place progresses. If the pipe to be treated is of considerable length, then because of such contraction, additional lengths of tubing are joined, if necessary, to the trailing end of the tubing before same is drawn into the pipe, or an excess length of the tubing is initially allowed ot protrude from the near end of the pipe and as the endwise shrinkage of the tubing proceeds, such excess will be drawn into the pipe. Such tube lengths may be joined by telescoping male and female, or spigot and bell, joint portions. The male and female portions may be adhered together as by a suitable known vinyl solution adhesive, or, in the case of a ball and spigot joint, same may be wrapped with adhesive tape, such as one bearing an acrylic nitrile adhesive on a polypropylene backing. Such a tape will be sufficiently freely stretchable so as not to impede expansion of the tubing.

With the present invention as applied for example to the sealing of leaks in a gas service line running, for example, from the curb to the basement of a house, such line is first isolated from the gas main by shutting a valve at the curb, if one is located there, and the gas is then vented from the line and the plastic tubing inserted. If there is no such valve present, the end of the line in the basement (the near end) may be opened, and the gas pressure will not ordinarily be so great but what such end may then be plugged as with a rubber sponge, and the tubing may be fed in through an opening in the sponge until the far end of the plastic tubing reaches the far end of the service line. The far end of the tubing may be capped as by a suitable frangible or easily rupturable flanged plastic disk or the like, whereupon suitable heating means, such as an electrical resistance heater or radiant heating device, may be inserted through the tubing to the far end and gradually withdrawn to the near end as the tubing becomes progressively heated and expanded along its length. If the far end of the service line has a valve which can be closed, then the far end of the tubing need not be plugged. Nitrogen or air may be blown in from a nitrogen bottle or compressor through a second and interior tubing extending along within the expansible tubing, this air being conducted along and about the heating means and thence back along the interior of the expansible tubing and surrounding the interior tubing, and discharged at the near end of the plastic tubing. Alternatively, instead of using an electrical heater, steam may be conducted in through the interior tubing at a temperature and pressure such that it will largely condense at the region within the far end of the interior tubing, thereby heating the plastic tubing at that region while the interior tubing conducting the steam is progressively withdrawn to cause heating by the steam of the plastic tubing progressively from the far end to the near end. When steam is used, the far end of the plastic tubing should be plugged and any joints in the plastic tubing should be carefully sealed, whereby condensate will not escape into the space between the plastic tubing and the walls of the pipe which would interfere with adhesion of the expanded plastic tubing in place.

Various further and more specific objects, features and advantages of the invention will appear from the description given below, taken in connection with the accompanying drawings, illustrating by way of example preferred forms of the invention.

Figure 1A:
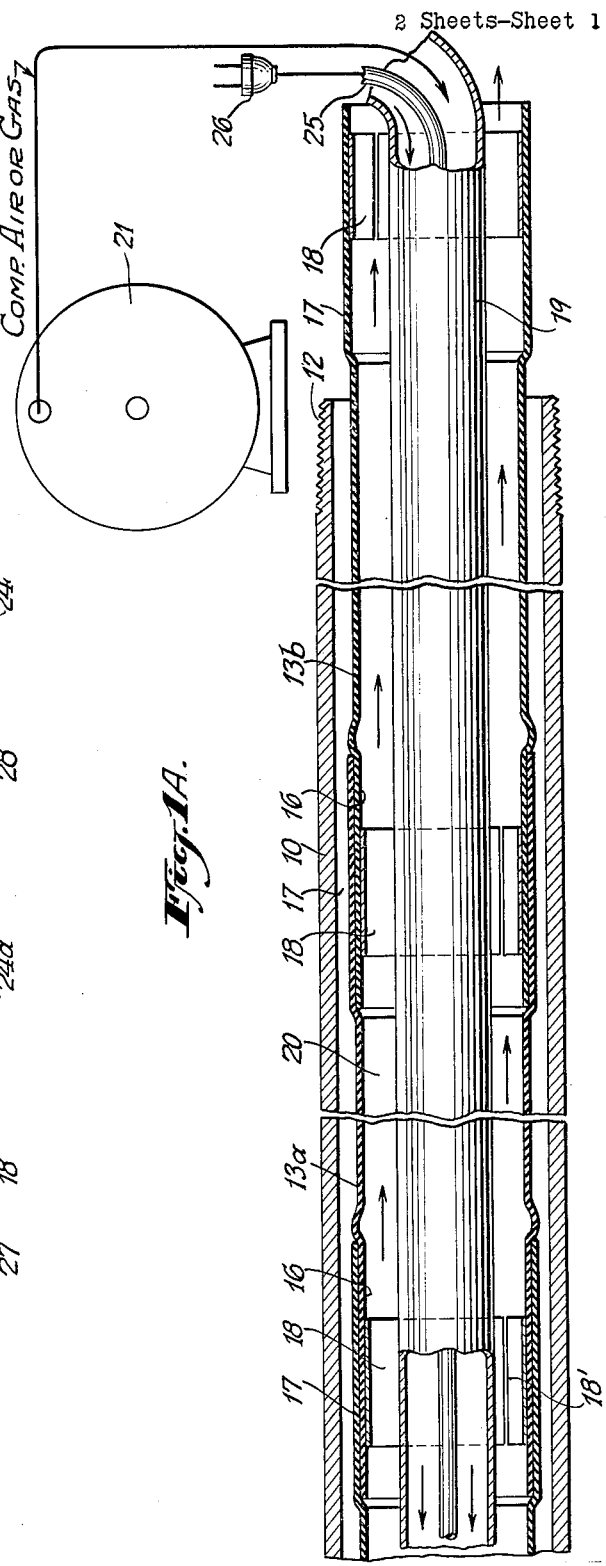

In the drawings:

FIGS. 1 and 1A illustrate one embodiment of the method and means for carrying out the invention in sealing the leaks of a branch service line running from a gas main to the basement of a customer's house, FIG. 1 showing portions of the service line at the region of the gas main or "far end" of the service line, and FIG. 1A illustrating portions at the region of the customer's basement or the "near end";

FIG. 2 somewhat schematically illustrates another embodiment of the invention;

FIG. 3 somewhat schematically illustrates still another embodiment; and

FIG. 4 illustrates the manner in which an end cap on the plastic tubing as used with the embodiment of FIG. 3, may be pierced and opened after the plastic tubing has been expanded into place to seal the leaks in the service line.

Referring now to the drawings in further detail, a length of underground gas pipe is shown at 10 forming a service line extending, for example, from a valve 11 located at the curb or adjacent the gas main to which the service line is connected, this pipe extending into the customer's basement and terminating as at 12, where, as shown, the pipe has been uncoupled after closing the valve 11 preparatory to sealing the leaks in the service line.

A succession of lengths of interconnected plastic tubing of the type hereinabove referred to are shown at 13, 13a, 13b, after having been inserted in the pipe 10 to extend inwardly of the end 12 thereof to the far end, as indicated at 14. The interconnected ends of these sections of tubing may be shaped to provide telescopically engaged male and female (or spigot and bell), joint portions as at 16, 17, between which suitable adhesive means as above referred to may be used for effectively sealing these joints, as hereinafter further described.

The plastic tubing as at 13, which is expansible responsive to heat, should, when initially inserted in the pipe 10, be of a diameter such that same may freely be slid into place and may preferably have a wall thickness of $\frac{1}{16}''$ or $\frac{3}{32}''$, for example, and should preferably be formed of polyvinyl chloride which has been extruded to tubular form when hot and then passed through suitable restricting means, such as a die means, and there chilled with a diameter which it is to have when initially inserted in the pipe. Preferably such tubing should be normally of a firm or semi-rigid nature so that it may be easily thrust into the pipe and will maintain its circular cross-sectional shape without collapsing, but upon subjecting the same to a temperature, say of around 300° F., it will expand and thereby come into firm engagement with the interior walls of the pipe. Plastic tubing having these properties may now be obtained, for example, from A.M.P., Inc., of Harrisburg, Pennsylvania, among other possible sources. Another type of such tubing, of a somewhat less firm nature but which has the requisite "memory" characteristics responsive to heat, may be obtained from Minnesota Mining & Manufacturing Company of St. Paul, Minnesota. Such tubing as furnished may be expanded in diameter by some fifty percent upon heating to temperatures in the neighborhood of 300° F. and at the same time the tubing will normally shrink longitudinally by an amount in the neighborhood of one inch per foot of original length. The tubing having such "memory" characteristics, upon heating and expanding in diameter (and shrinking in length), will substantially permanently retain its new dimensions, and thus the expansion will be ample for the purposes of the present invention to permit the plastic tubing to be expanded into firm permanent pressing engagement with the interior of the walls of the pipe 10. Tubing having the desired "memory" characteristics made effective upon heating, may also be available of materials other than polyvinyl chloride, for example polytetrafluoroethylene and polychlorotrifluoroethylene. It should be noted that the expansible plastic tubing should be formed of a material which will retain an expanded diameter after heating, as distinguished from a material which will expand because of the high temperature coefficient of expansion and then become contracted again after cooling.

Before the tubing 13 is inserted, its external surfaces are covered by a suitable sealing material which will become tacky or sticky, at least upon heating of the tubing as above described, so that when the tubing expands into contact with the interior walls of the pipe, such coating material will adhere to the latter and aid in effectively closing and sealing all leaks, cracks or crevices in the pipe or its joints, the sealing material, after cooling of the tubing preferably becoming firm or solidified. This material may comprise a coating, for example $\frac{1}{32}''$ thick, of soft adhesive self-sealing asphalt available on the market under A.S.T.M. Specification 449.49, Type A for example, although other bituminous materials may well be used for the purpose.

At the far end 14 within the tubing 13 and also within each of the joints thereof as at 16, 17, preferably cylindrical spring elements as at 18 are provided in the form of small steel cylinders longitudinally slitted as at 18', and of dimensions such that same will normally exert pressure radially outwardly against the interior walls of the plastic tubing 13, to aid in the expansion of the tubing at the points where these thimbles are located when the tubing is heated. This is desirable within the far end of the tubing where the heat may be insufficient or too uncertain to insure prompt expansion of the plastic tubing and at the joints where the plastic tubing is of double thickness.

Concurrently, with the insertion of the plastic tubing 13 within the pipe or thereafter, a length of inner tubing as at 19 is inserted, this tubing being formed for example of "Teflon" and of a diameter considerably smaller than the plastic tubing 13, so that there is an annular space 20 therebetween, for a purpose hereinafter explained. The near end of the tubing 19 may be connected to an air compressor as at 21 and the far end may be connected as by a collar 22 to a length of "Teflon" tubing 23 for containing a suitable electrical resistance or radiant heating element 24 of any suitable known type, this in turn being provided with connection wires as at 25, running back to the near end to a source of current supply as at 26. The heating element 24 should be accompanied at its inner end by some suitable known form of thermostat means at 24a for controlling the electric circuit therefor to limit the heating of the heating element within the temperature range required for activating the expansible tubing 13. The heating element and thermostat may be retained in their longitudinal positions as by removable cotter pins 27 and the walls thereof may be retained in spaced relation to the tube 23 as by helically-shaped spacer supporting means 28.

After the arrangements as above described have been inserted into the pipe 10, and upon connecting the current to the electrical heating element, compressed air or gas is allowed to flow through the inner tubing 19 to become heated as it passes the heating element 24 and the thermostat means 24a, the heated air thence passing out the far end of tubing 23 and causing the far end at the region 14 of the plastic tubing 13 to become heated and expanded into tight, sealing engagement within the far end of the pipe 10, such expansion being aided by the thimbles 18 at regions where same are located. The hot air thereafter will pass back to the near end through the clearance space between the tubings 13 and 19 and be discharged at the near end. At this time the tubing 19, together with the heating element and control thermostat, may be gradually withdrawn at a suitable rate, readily determinable by trial, so as to heat and expand progressively the successive portions along the length of the expansible plastic tubing 13 all the way from the far end 14, and finally back to the near end at 12.

With the embodiment as above described in FIGS. 1 and 1A, the branch service pipe 10 will now be permanantly sealed against leakage throughout its length, and the inner end may then be reconnected for use in the normal way and the valve 11 may be opened.

Reference will now be had to the modified arrangement as somewhat diagrammatically indicated in FIG. 2. Here the arrangements may be the same as above described in connection with FIGS. 1 and 1A, with the exceptions noted below. This arrangement is intended to be used where there is no shut-off valve as at 11 available, as in the case of FIG. 1, for isolating a gas service line as at 10' from a gas main as at 30. Accordingly, in this instance, the inner end of the service line may be disconnected and temporarily plugged as by a rubber sponge means 31, through the center of which the expansible plastic coated tubular means as at 13 and the contents thereof, as in the case of FIG. 1, may be inserted, to extend to the far end. Here, however, the far end of the tubing 13 is closed as by a suitable flanged disc or plugging means as at 32 of a nature which may readily be broken or pierced after operations are completed. The air may be introduced through the inner pipe 19, as in the case of FIGS. 1 and 1A, to flow past the heating element and control thermostat to the plugged end 32, and thence back through the clearance space between the tubes 13 and 19, to the near end. The arrangement may be operated in a manner which will be readily apparent from the above explanations of FIGS. 1 and 1A. After the tubing 13 with its coating thereon has been expanded into its sealing engagement with the interior of pipe 10', the sponge means (or other suitable closure means) as at 31, may be removed, and the service line reconnected for normal use. But, first it will be necessary to open up the plug means at 32. This may be accomplished in a manner such as shown in FIG. 4, where a suitable rod or plumber's "snake" 33 is shown as protruding into the far end of the tubing 13, and this may be used to break open the plug means 32, and, if desired, the member 33 may be provided with a suitably pointed element as at 34 to aid in accomplishing this purpose.

The embodiment of the invention as shown FIG. 3, is like that of FIG. 2, except that here, instead of supplying air into the inner tubing 19, to be heated by an electrical heating means, this tubing may be connected to a source of steam, so that same will flow to the far end of the tube 19. The steam should be of a temperature such that same, or a considerable portion thereof, will become condensed at the far end, thus giving up sufficient heat to cause the desired expansion of the plastic tubing 13 and, as the tubing 19 is slowly withdrawn for allowing progressive heating of succeeding lengths of the plastic tubing. As in the case of FIG. 2, the inner end of the plastic tubing is provided with closure or plug means as at 32', and care should preferably be taken that none of the condensate has opportunity to escape to the exterior of the tubing 13, where it would tend to interfere with proper adhesion of the coating on the latter with the interior of the surfaces of the pipe 10''.

Although certain particular embodiments of the invention are herein disclosed for purposes of explanation, further modifications thereof, after study of this specification, will be apparent to those skilled in art to which the invention pertains. Reference should accordingly be had to the appended claims in determining the scope of the invention.

What is claimed and desired to be secured by Letters Patent is:

1. Method for internally sealing lengths of pipe and the like which comprises: inserting therein a length of plastic tubing of a diameter freely to enter the pipe and of a type normally and permanently expansible upon being temporarily subjected to heat, to a diameter sufficient to press against the interior walls of the pipe while the tubing is subject to normal and permanent longitudinal shrinkage, the external surface of said tubing being coated with a sealing material; progressively moving electrical heating means along within the length of said tubing; conducting a supply of gas through a conduit located internally of said tubing, to flow over said electrical heating means and thence against the interior surfaces of said tubing; and controlling the temperature of said heating means and consequently the temperature of said air passing same, within a range to cause such expansion of said tubing as the heating means is progressively advanced and whereby the tubing with the sealing material thereon becomes permanently engaged against the interior surfaces of the pipe.

2. Method for internally sealing lengths of pipe and the like which comprises: inserting therein a length of plastic tubing of a diameter less than that of the pipe and of a type normally and permanently expansible, upon being temporarily subjected to heat, to a diameter at least as great as that of the interior surface of the walls of the pipe, the external surface of said tubing being coated with a sealing material; and applying a stream of heated fluid to the interior of said tubing for progressively subjecting successive portions along within same to a temperature sufficient to cause such expansion, whereby the tubing with the sealing material thereon comes into engagement under pressure with the interior surfaces of the pipe.

3. Method in accordance with the foregoing claim 2 and in which said fluid comprises steam conducted through a conduit arranged internally of the tubing and extending from the near end of the tubing initially to the far end thereof, the far end of the tubing being plugged, whereby said steam condenses at the region of the far end within the tubing; and gradually withdrawing said conduit toward the near end, whereby the succeeding portions of the tubing become heated by the steam and expanded.

4. A method for internally lining underground pipes and the like of extensive length, said method comprising the steps of inserting into such pipe a length of plastic tubing of a type which, upon application of heat thereto, expands diametrically to a degree such that it presses firmly against the inside surface of the pipe and continues to so press against the pipe after again cooling, thereafter heating said tubing along a limited portion of its length so that only said limited portion expands diametrically to press against and be anchored to said pipe and so that only said limited portion of said tubing undergoes corresponding longitudinal contractions, the longitudinal movement of said tubing which accompanies said longitudinal contraction being thus largely limited to the unexpanded portions thereof, and then successively so heating adjacent limited length portions of said tubing to cause diametrical expansion thereof, whereby the resulting longitudinal contraction along the length of said tubing is largely limited to its unexpanded regions.

5. A method as in claim 4 wherein said length of plastic tubing is placed in alignment with one end of said pipe and said heating is initiated at said one end and continues progressively toward the opposite end of said pipe.

6. A method as in claim 4 wherein said heating is carried out from locations within said tubing.

7. A method as in claim 4 including the step of coating said tubing with a thermoplastic sealing adhesive prior to inserting it into said pipe.

8. An assembly of means for sealing leaks in pipes comprising: a length of plastic tubing of a diameter freely to enter the pipe and to extend along within same, said tubing being of a type which, upon application of heat thereto, expands diametrically to a degree such that is presses against the inside surface of the pipe and continues to so press against the pipe after again cooling, heating means constructed to heat said tubing along a limited portion of its length so that only said limited portion expands diametrically to press against and be anchored to said pipe and so that only said limited portion of said tubing undergoes corresponding longitudinal contraction, the longitudinal movement of said tubing which accompanies said longitudinal contraction being thus largely limited to the unexpanded portions thereof, and means extending along said tubing and connected to said heating means for gradually moving said heating means along said tubing to heat successively adjacent limited length portions of said tubing to cause diametrical expansion thereof, whereby the resulting longitudinal contraction along the length of said tubing is largely limited to its unexpanded regions.

9. An assembly of means as in claim 8 wherein said means for moving said heating means is constructed to convey energy to said heating means and wherein said heating means is constructed to apply said energy in the form of heat to said tubing.

10. An assembly of means as in claim 9 wherein said means for moving said heating means includes electrical conductors and said heating means is an electrical heater.

11. An assembly of means as in claim 9 wherein said means for moving said heating means includes heated fluid conduit means and wherein said heating means is constructed to direct said heated fluid into contact with a limited region of said heated tubing.

12. An assembly of means as in claim 8 wherein said tubing is coated with a thermoplastic sealing adhesive material.

References Cited by the Examiner
UNITED STATES PATENTS

| | | | |
|---|---|---|---|
| 2,027,961 | 1/1936 | Currie | 264—230 |
| 2,312,993 | 3/1943 | Stephens | 264—269 X |
| 2,672,161 | 3/1954 | Brauer | 138—97 |
| 2,977,994 | 4/1961 | Xenis | 138—97 |
| 3,103,235 | 9/1963 | Stringham | 138—97 |
| 3,123,101 | 3/1964 | Blount et al. | 138—97 |

FOREIGN PATENTS

| | | |
|---|---|---|
| 807,413 | 1/1959 | Great Britain. |

LAVERNE D. GEIGER, *Primary Examiner.*

LEWIS J. LENNY, *Examiner.*

T. MOORHEAD, *Assistant Examiner.*